United States Patent

Daines et al.

[11] Patent Number: 5,413,375
[45] Date of Patent: May 9, 1995

[54] METHOD AND APPARATUS FOR RETAINING AN AIRBAG WITHIN A PASSENGER-SIDE AIRBAG MODULE

[75] Inventors: Michael J. Daines, Brigham City; Michael D. Jones, Hooper, both of Utah

[73] Assignee: Morton International, Inc., Chicago, Ill.

[21] Appl. No.: 213,253

[22] Filed: Mar. 15, 1994

[51] Int. Cl.⁶ .................................. B60R 21/16
[52] U.S. Cl. ........................ 280/728.2; 248/99
[58] Field of Search ........... 280/728 A, 743 R, 740, 280/732, 731, 730 R, 728 R; 248/99

[56] References Cited

U.S. PATENT DOCUMENTS

| | | | |
|---|---|---|---|
| 690,412 | 1/1902 | Erickson | 248/99 |
| 3,257,090 | 6/1966 | Frazier | 248/99 |
| 4,548,372 | 10/1985 | Lutzker | 248/99 |
| 4,620,683 | 11/1986 | Claydon et al. | 248/99 |
| 5,074,585 | 12/1991 | Satoh | 280/728 A |
| 5,096,222 | 3/1992 | Komerska et al. | 280/728 A |
| 5,190,252 | 3/1993 | Schrager | 248/99 |
| 5,255,937 | 10/1993 | Emambakhsh et al. | 280/728 A |
| 5,263,738 | 11/1993 | Oda et al. | 280/743 R |
| 5,263,739 | 11/1993 | Webber et al. | 280/743 R |

FOREIGN PATENT DOCUMENTS

| | | | |
|---|---|---|---|
| 0558240 | 9/1993 | European Pat. Off. | 280/728 A |
| 5185889 | 7/1993 | Japan | 280/743 R |
| 5294203 | 11/1993 | Japan | 280/728 A |

Primary Examiner—Margaret A. Focarino
Assistant Examiner—Peter C. English
Attorney, Agent, or Firm—George W. Rauchfuss, Jr.; Gerald K. White

[57] ABSTRACT

A one-piece molded plastic retainer is employed to hold each of two opposed edges of an airbag mouth in engagement with a reaction canister. The retainer is sewn, or otherwise secured, in the airbag mouth and includes a rod carrying a pair of integral discs which snap-fit into rails in a diffuser plate. The rails are thereafter slid into channels in the reaction canister. The rod includes a stiffening rib to resist stresses imposed during assembly and during bag deployment.

12 Claims, 2 Drawing Sheets

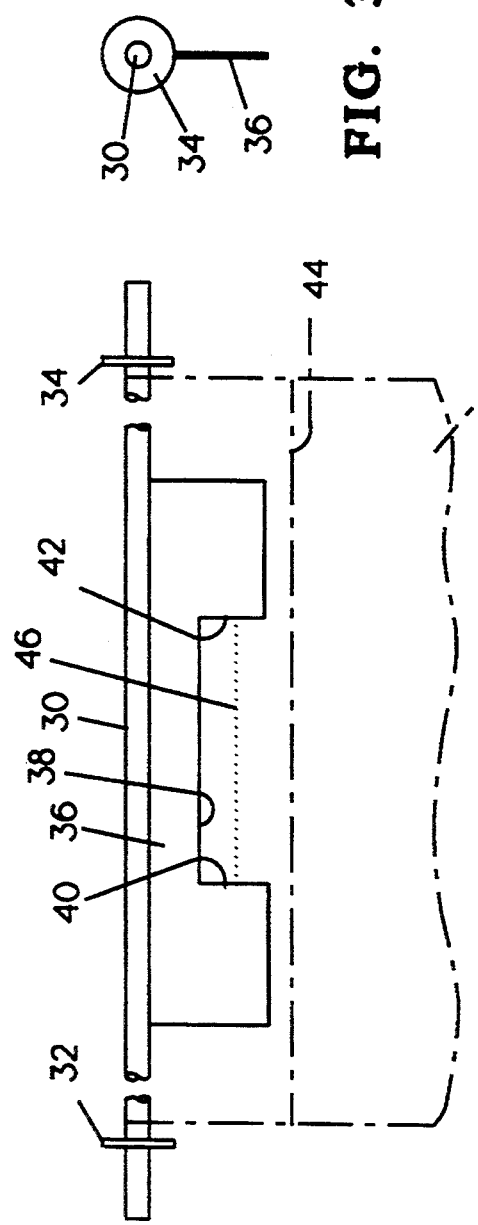
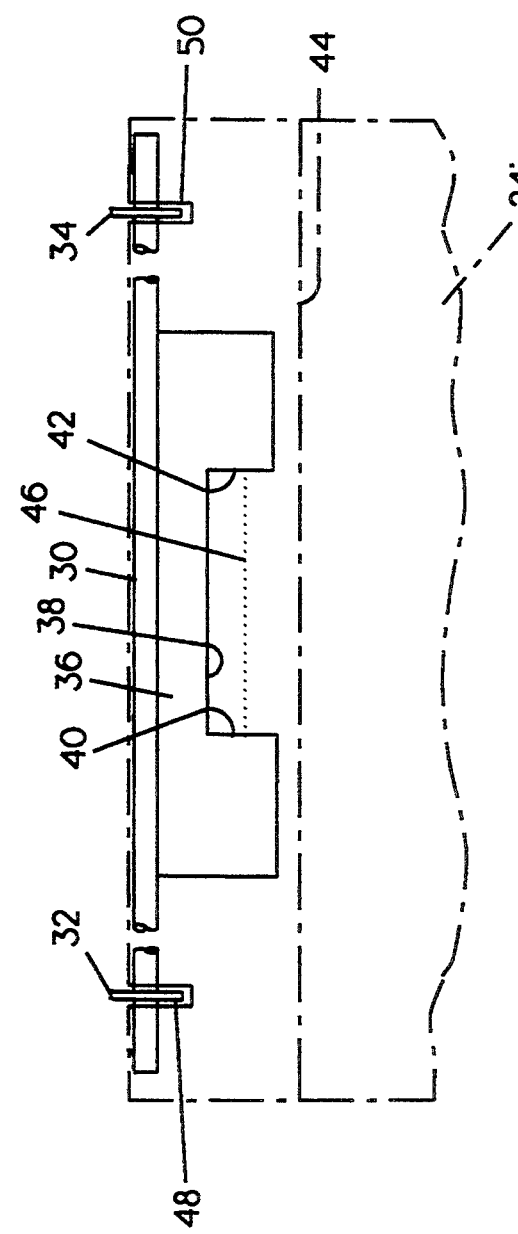

5,413,375

METHOD AND APPARATUS FOR RETAINING AN AIRBAG WITHIN A PASSENGER-SIDE AIRBAG MODULE

TECHNICAL FIELD

This invention relates to the field of vehicle airbag modules. More specifically, it relates to the field of retaining airbags within a passenger-side airbag module.

BACKGROUND ART

The housing structure of a passenger-side vehicle airbag module provides protection for the gas generator and the inflatable bag until the time of deployment of the latter. This structure includes means for mechanically coupling the mouth of the airbag to the reaction canister. The load resulting from airbag deployment is large and, accordingly, it has been necessary in the past to use relatively heavy metal parts for performing the coupling function. In addition, the need for multiple parts has increased the complexity of assembly.

Accordingly, it is a primary object of the present invention to provide a lightweight, one piece retainer for securing an airbag within a passenger-side module. Another object is to provide a simplified method of assembly. Other objects, features, and advantages will become apparent from the following description and appended claims.

DISCLOSURE OF INVENTION

A one piece retainer rod, including flanges and a stiffening rib, is sewn into the edge of a passenger-side airbag. Two such edges on opposite sides of the airbag mouth permit the retainer rod to be snapped into engagement with the U-shaped rails of the diffuser plate. The rails of the diffuser plate are thereafter inserted into channels formed along the open trough of the reaction canister.

BRIEF DESCRIPTION OF THE DRAWINGS

FIG. 2 is an elevational view of the retainer rod of this invention illustrating its relationship to the edge of an airbag;

FIG. 3 is an end view of the retainer rod of FIG. 2; and

FIG. 4 is a view similar to FIG. 2 of a modified form of the invention.

BEST MODE FOR CARRYING OUT THE INVENTION

Figure 1:
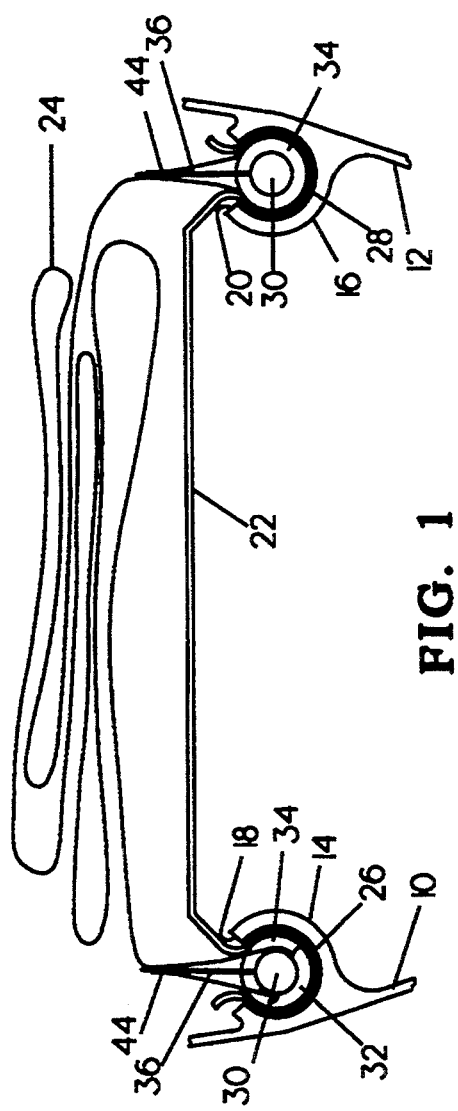
FIG. 1 is an end view of a portion of a reaction canister showing a diffuser plate and a folded airbag.

Referring first to FIG. 1, the upper portions of the sidewalls 10, 12 of a trough-shaped reaction canister are illustrated, the end plates of the canister being removed. Typically the canister may be extruded of aluminum and each sidewall carries upon its inner surface a mounting channel 14, 16 into which extend longitudinal openings 18, 20. The mouth of the reaction canister is spanned by a diffuser plate 22. The function of the diffuser 22 is to evenly spread the gases from an inflator (not shown) to the airbag 24 which is schematically shown in collapsed and folded form.

One such diffuser plate is illustrated and described in detail in copending application Ser. No. 08/181,897 filed Jan. 14, 1994 by D. R. Lauritzen et al. and assigned to the same assignee as the present invention. The disclosure of that application is incorporated by reference and made a part hereof. The edges of the metal diffuser plate 22 are curved downwardly and bent to form a pair of U-shaped rails 26, 28 which are arranged to slide within the open ends of the respective channels 14, 16.

FIGS. 2 and 3 illustrate the retainer rod of this invention. Two such rods are employed in the invention on opposite sides of the mouth of the airbag 24. However, since they are identical, only one need be described.

The retainer is preferably molded from any suitable plastic such as, for example, nylon or polyethylene. It comprises a cylindrical rod 30 which, in the FIG. 2 embodiment, has a length greater than that of one edge of the airbag mouth. In one embodiment, this length was approximately 250 mm. At each end of the rod is an integral, disc-shaped flange 32, 34. In the illustrated embodiment, the spacing between the flanges 32, 34 is sufficient to span the length of the edge of the airbag 24 which is indicated in phantom in FIG. 2. In the referenced embodiment, the rod 30 had a diameter of 5 mm and each flange had a diameter of approximately 11 mm and a thickness of 0.3 mm. Also integral with the rod 30 is a substantially planar rib 36 which extends longitudinally along and radially outward from the rod 30 between the two flanges 32, 34. The rib 36 is substantially rectangular and in the described embodiment was approximately 0.3 mm in width. Extending inwardly from the outermost edge of the rib 36 is a rectangular recess 38. The ends of the recess 38 form a pair of stops 40, 42.

The retainers are sewn into opposed edges of the mouth of the airbag 24. The airbag sidewall material is wrapped around the respective rod 30 such that its edge 44 substantially covers the stiffening rib 36. A line of stitching 46 connects the two layers of bag material and extends between the stops 40, 42. The stops serve the dual functions of preventing the retainer from separating from the airbag prior to installation and of keeping the retainer centered along the edge of the airbag mouth. While stitching has been described and illustrated, it will be understood that other means may be employed for adhering the bag material upon itself. These means include, but are not limited, to the use of adhesives and plastic welding techniques.

In assembling the module, the airbag 24 with the retainers in place is first assembled to the diffuser plate 22. The diffuser plate is made of sheet metal and, accordingly, its U-shaped rails 26, 28 have a certain amount of resiliency. As a result, the flanges 32, 34 may be forced into the rails by snap-fit engagement. Thereafter, the diffuser 22 with the airbag 24 attached is assembled to the reaction canister by merely sliding the rails 26, 28 into the respective channels 14, 16 as illustrated in FIG. 1.

The depiction of the retainer and airbag is reversed as between FIG. 1 on the one hand and FIGS. 2 and 3 on the other. Referring particularly to FIG. 1, it will be noted that, when installed on a reaction canister, the stiffening ribs 36 extend in the direction of airbag deployment. This results in substantial stiffening of the rod 30 against bending forces in that direction. Not only does this serve to absorb the load resulting from airbag deployment, but it also makes it easier to insert the reinforced edge of the airbag mouth into the channel during assembly of the module.

FIG. 4 illustrates a modified form of the invention wherein the rod 30 is wholly contained within the material of the airbag 24'. The airbag is provided with slots 48, 50 through which the flanges 32, 34 respectively, extend. In other respects, the FIG. 4 version is essentially identical and, accordingly, similar reference numerals have been retained.

It will now be noted that the major important features of this invention have been incorporated into one molded part, thereby simplifying production. In addition, the one-piece molded plastic retainer is much cheaper than any combination of materials or parts and is also much lighter than alternate materials such as aluminum or steel. The retainer design results in ease of assembly and also helps to insure that parts are not lost during shipping and handling. The rod is easily sewn into the airbag and does not threaten airbag integrity by occasioning any additional stress in the bag.

It is believed that the many advantages of this invention will now be apparent to those skilled in the art. It will also be apparent that a number of modifications may be made therein without departing from its spirit and scope. Accordingly, the foregoing description is to be construed as illustrative only, rather than limiting. This invention is limited only by the scope of the following claims.

We claim:

1. In an airbag for an automotive passenger airbag module formed from flexible material and having a mouth including first and second opposed edges, the improvement which comprises:
    each of said first and second opposed edges having incorporated therein a retainer rod;
    first and second disc-shaped flanges carried by each of said retainer rods; and
    a substantially planar stiffening rib carried by each of said retainer rods and extending radially outward therefrom longitudinally therealong intermediate said first and second flanges.

2. The improvement of claim 1 additionally including means for fixedly securing each of said retainer rods to its respective mouth edge.

3. The improvement of claim 2 wherein said securing means is formed by the material of said airbag encircling each of said retainer rods and additionally including means for adhering the encircling material upon itself.

4. The improvement of claim 1 wherein the length of each of said rods is greater than that of its respective mouth edge and wherein said flanges are spaced outwardly of said mouth edge.

5. The improvement of claim 1 wherein each of said edges defines slots through which said flanges extend.

6. The method of assembling an airbag with a reaction canister and a diffuser plate which comprises:
    providing a reaction canister having an open trough bounded by first and second opposed mounting channels having longitudinal openings therealong;
    providing a diffuser plate adapted to span said open trough and having opposite edges forming first and second rails of U-shaped cross section adapted to fit within the respective first and second mounting channels;
    providing an airbag having an open mouth defined by opposed first and second edges, each of said edges including a retaining rod therein carrying first and second flanges;
    inserting each of said retaining rods and its respective flanges into a respective one of said first and second rails; and
    sliding both of said first and second rails into the respective first and second channels of said reaction canister.

7. The method of claim 6 wherein said flanges are inserted into said rails by snap-fit engagement.

8. A retainer for securing one side of the mouth of an automotive airbag within a reaction canister which comprises:
    a rod;
    first and second radially extending spaced flanges integral with said rod; and
    a substantially planar rib integral with said rod and extending radially outwardly therefrom between said first and second flanges, said rib defining first and second stops longitudinally spaced relative to said rod, said stops being formed by a recess in said rib.

9. A retainer for securing one side of the mouth of an automotive airbag within a reaction canister which comprises:
    a rod;
    first and second radially extending spaced circular disc flanges integral with said rod; and
    a substantially planar rib integral with said rod and extending radially outwardly therefrom between said first and second flanges, said rib defining first and second stops longitudinally spaced relative to said rod, said stops being formed by a recess in said rib.

10. In an airbag for an automotive passenger airbag module formed from flexible material and having a mouth including first and second opposed edges, the improvement which comprises:
    each of said first and second opposed edges having incorporated therein a retainer rod;
    first and second disc-shaped flanges carried by each of said retainer rods;
    a stiffening rib carried by each of said retainer rods and extending longitudinally therealong intermediate said first and second flanges, each of said stiffening ribs including a recess therein defining first and second stops;
    means for fixedly securing each of said retainer rods to its respective mouth edge formed by the material of said airbag encircling each of said retainer rods; and
    means located within each of said recesses for adhering the encircling material upon itself.

11. The improvement of claim 10 wherein said adhering means is stitching.

12. In an airbag for an automotive passenger airbag module formed from flexible material and having a mouth including first and second opposed edges, the improvement which comprises:
    each of said first and second opposed edges having incorporated therein a retainer rod shorter than the length of its respective edge;
    each of said first and second opposed edges defining slots therethrough;
    first and second disc-shaped flanges carried by each of said retainer rods, said flanges extending through said slots; and
    a stiffening rib carried by each of said retainer rods and extending longitudinally therealong intermediate said first and second flanges.

* * * * *